US009983796B2

(12) United States Patent
Yang et al.

(10) Patent No.: US 9,983,796 B2
(45) Date of Patent: May 29, 2018

(54) SYSTEMS AND METHODS FOR PROVISIONING FREQUENTLY USED IMAGE SEGMENTS FROM CACHES

(71) Applicant: Veritas Technologies LLC, Mountain View, CA (US)

(72) Inventors: Yong Yang, Beijing (CN); Weibao Wu, Vadnais Heights, MN (US)

(73) Assignee: Veritas Technologies LLC, Mountain View, CA (US)

( * ) Notice: Subject to any disclaimer, the term of this patent is extended or adjusted under 35 U.S.C. 154(b) by 0 days. days.

(21) Appl. No.: 14/856,586

(22) Filed: Sep. 17, 2015

(65) Prior Publication Data
US 2017/0083446 A1  Mar. 23, 2017

(51) Int. Cl.
G06F 17/30 (2006.01)
G06F 3/06 (2006.01)
G06F 11/14 (2006.01)

(52) U.S. Cl.
CPC .............. *G06F 3/061* (2013.01); *G06F 3/067* (2013.01); *G06F 3/0656* (2013.01); *G06F 11/14* (2013.01); *G06F 17/30* (2013.01)

(58) Field of Classification Search
None
See application file for complete search history.

(56) References Cited

U.S. PATENT DOCUMENTS

| 7,051,038 | B1 * | 5/2006 | Yeh | G06F 17/30575 707/603 |
| 8,868,839 | B1 * | 10/2014 | Banerjee | G06F 12/0804 711/118 |
| 2002/0069322 | A1 | 6/2002 | Galbraith et al. | |
| 2008/0270833 | A1 * | 10/2008 | McMillen | G06F 17/30985 714/32 |
| 2011/0131390 | A1 * | 6/2011 | Srinivasan | G06F 3/0622 711/209 |

(Continued)

OTHER PUBLICATIONS

"Velocity", https://velocitycloud.com/, as accessed Jul. 21, 2015, (Feb. 2, 2011).

(Continued)

*Primary Examiner* — Tracy Chan
(74) *Attorney, Agent, or Firm* — FisherBroyles LLP

(57) ABSTRACT

The disclosed computer-implemented method for provisioning frequently used image segments from caches may include (1) storing a representation and a use counter for an image segment that is hosted on a storage system in a list of representations and use counters for image segments hosted on the storage system, (2) incrementing a current value of the use counter for the image segment in the list of representations and use counters each time the image segment is provisioned from the storage system, (3) determining that the current value of the use counter for the image segment has met a predetermined threshold for frequent image-segment provisioning, (4) hosting the image segment in a cache that enables quicker provisioning than the storage system enables, and (5) provisioning the image segment from the cache in response to a request to provision the image segment. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2011/0289257 A1* | 11/2011 | Hathaway | ............... | G06F 12/12 |
| | | | | 711/3 |
| 2012/0209814 A1* | 8/2012 | Zhang | ................ | G06F 11/1458 |
| | | | | 707/654 |
| 2014/0164548 A1* | 6/2014 | Cudak | .................... | G06F 17/30 |
| | | | | 709/213 |
| 2014/0337591 A1* | 11/2014 | Guo | ................... | G06F 11/1453 |
| | | | | 711/162 |
| 2015/0339064 A1* | 11/2015 | Feng | ...................... | G11C 29/44 |
| | | | | 711/103 |
| 2016/0147461 A1* | 5/2016 | Fan | ...................... | G06F 3/0611 |
| | | | | 711/104 |

OTHER PUBLICATIONS

"Veritas NetBackup", https://www.veritas.com/product/backup-and-recovery/netbackup?id=campaign-netbackup, as accessed Jul. 21, 2015, (On or before Jul. 21, 2015).

\* cited by examiner

SYSTEMS AND METHODS FOR PROVISIONING FREQUENTLY USED IMAGE SEGMENTS FROM CACHES

BACKGROUND

The growing popularity of cloud computing has enabled individuals and organizations to provision and de-provision virtual computing devices according to their needs. An organization may be able to spin up dozens of new devices from stored images in minutes, rather than spending hours manually configuring physical machines. Images may also be used as backups for important data or as default system configurations for various employee types. A newly hired developer might have one image provisioned to their new laptop while an accountant might have a different image provisioned to their desktop. Efficiently creating and storing images is an important problem, but so, too, is efficiently provisioning images. Neither end users nor administrators are especially patient about the delays that may arise from slow-functioning provisioning systems.

Traditional systems for provisioning systems from images may be designed for occasionally restoring backups after a critical failure and may not be optionally designed for frequently provisioning images. In some examples, traditional systems may be designed to provision images from complete images, rather than segments, and may not be optimally configured for provisioning from image segments. Accordingly, the instant disclosure identifies and addresses a need for additional and improved systems and methods for provisioning frequently used image segments from caches.

SUMMARY

As will be described in greater detail below, the instant disclosure describes various systems and methods for provisioning frequently used image segments from caches by keeping track of how often image segments are used and moving the most frequently used image segments to a cache.

In one example, a computer-implemented method for provisioning frequently used image segments from caches may include (1) storing a representation and a use counter for an image segment that is hosted on a storage system in a list of representations and use counters for image segments hosted on the storage system, (2) incrementing a current value of the use counter for the image segment in the list of representations and use counters each time the image segment is provisioned from the storage system, (3) determining that the current value of the use counter for the image segment has met a predetermined threshold for frequent image-segment provisioning, (4) hosting the image segment in a cache that enables quicker provisioning than the storage system enables, and (5) provisioning the image segment from the cache in response to a request to provision the image segment.

In one embodiment, hosting the image segment in the cache may include adding the fingerprint of the image segment to a list of fingerprints of image segments hosted in the cache. In this embodiment, provisioning the image segment from the cache may include determining, based on the presence of the fingerprint of the image segment in the list of fingerprints of image segments hosted in the cache, that the image segment is hosted in the cache.

In one embodiment, the predetermined threshold for frequent image-segment provisioning may be calculated based on a predetermined percentage of the most frequently provisioned image segments. In some examples, the computer-implemented method may further include removing the image segment from the cache in response to determining that the current value of the use counter for the image segment no longer meets the predetermined threshold for frequent image-segment provisioning.

In some embodiments, hosting the image segment in the cache may include storing information about at least one location of at least one additional image segment that is frequently provisioned alongside the image segment and that is also hosted in the cache. In some examples, provisioning the image segment from the cache may include efficiently provisioning the additional image segment from the cache by using the stored information about the location of the additional image segment. In one embodiment, the image segment may include a portion of a backup of a virtual machine.

In one embodiment, a system for implementing the above-described method may include (1) a storage module, stored in memory, that stores a representation and a use counter for an image segment that is hosted on a storage system in a list of representations and use counters for image segments hosted on the storage system, (2) an incrementing module, stored in memory, that increments a current value of the use counter for the image segment in the list of representations and use counters each time the image segment is provisioned from the storage system, (3) a determination module, stored in memory, that determines that the current value of the use counter for the image segment has met a predetermined threshold for frequent image-segment provisioning, (4) a hosting module, stored in memory, that hosts the image segment in a cache that enables quicker provisioning than the storage system enables, (5) a provisioning module, stored in memory, that provisions the image segment from the cache in response to a request to provision the image segment, and (6) at least one physical processor configured to execute the storage module, the incrementing module, the determination module, the hosting module, and the provisioning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) store a representation and a use counter for an image segment that is hosted on a storage system in a list of representations and use counters for image segments hosted on the storage system, (2) increment a current value of the use counter for the image segment in the list of representations and use counters each time the image segment is provisioned from the storage system, (3) determine that the current value of the use counter for the image segment has met a predetermined threshold for frequent image-segment provisioning, (4) host the image segment in a cache that enables quicker provisioning than the storage system enables, and (5) provision the image segment from the cache in response to a request to provision the image segment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
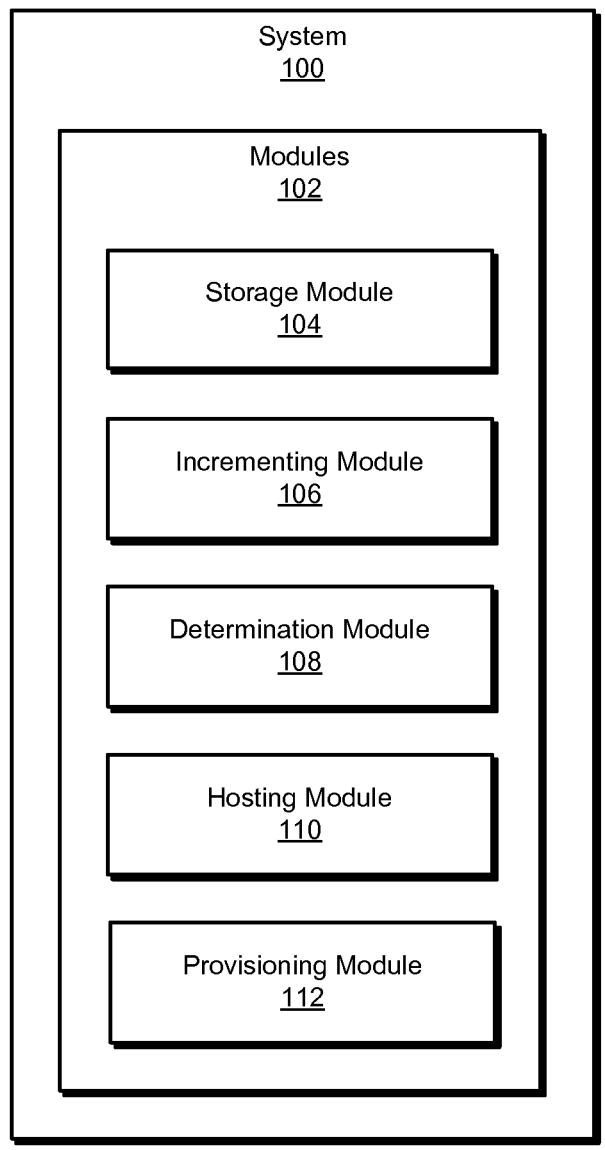
FIG. 1 is a block diagram of an exemplary system for provisioning frequently used image segments from caches.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for provisioning frequently used image segments from caches. As will be explained in greater detail below, by tracking which image segments are frequently provisioned and moving the frequently provisioned image segments to a cache, the systems and methods described herein may speed up provisioning. Additionally, by tracking which image segments are frequently provisioned together and storing the locations of those image segments in the cache, the systems and methods provided herein may further increase the speed and efficiency of provisioning.

The following will provide, with reference to FIGS. 1, 2, 4, and 5, detailed descriptions of exemplary systems for provisioning frequently used image segments from caches. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for provisioning frequently used image segments from caches. As illustrated in this figure, exemplary system 100 may include one or more modules 102 for performing one or more tasks. For example, and as will be explained in greater detail below, exemplary system 100 may include a storage module 104 that stores a representation and a use counter for an image segment that is hosted on a storage system in a list of representations and use counters for image segments hosted on the storage system. Exemplary system 100 may additionally include an incrementing module 106 that increments a current value of the use counter for the image segment in the list of representations and use counters each time the image segment is provisioned from the storage system. Exemplary system 100 may also include a determination module 108 that determines that the current value of the use counter for the image segment has met a predetermined threshold for frequent image-segment provisioning. Exemplary system 100 may additionally include a hosting module 110 that hosts the image segment in a cache that enables quicker provisioning than the storage system enables. Exemplary system 100 may also include a provisioning module 112 that provisions the image segment from the cache in response to a request to provision the image segment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
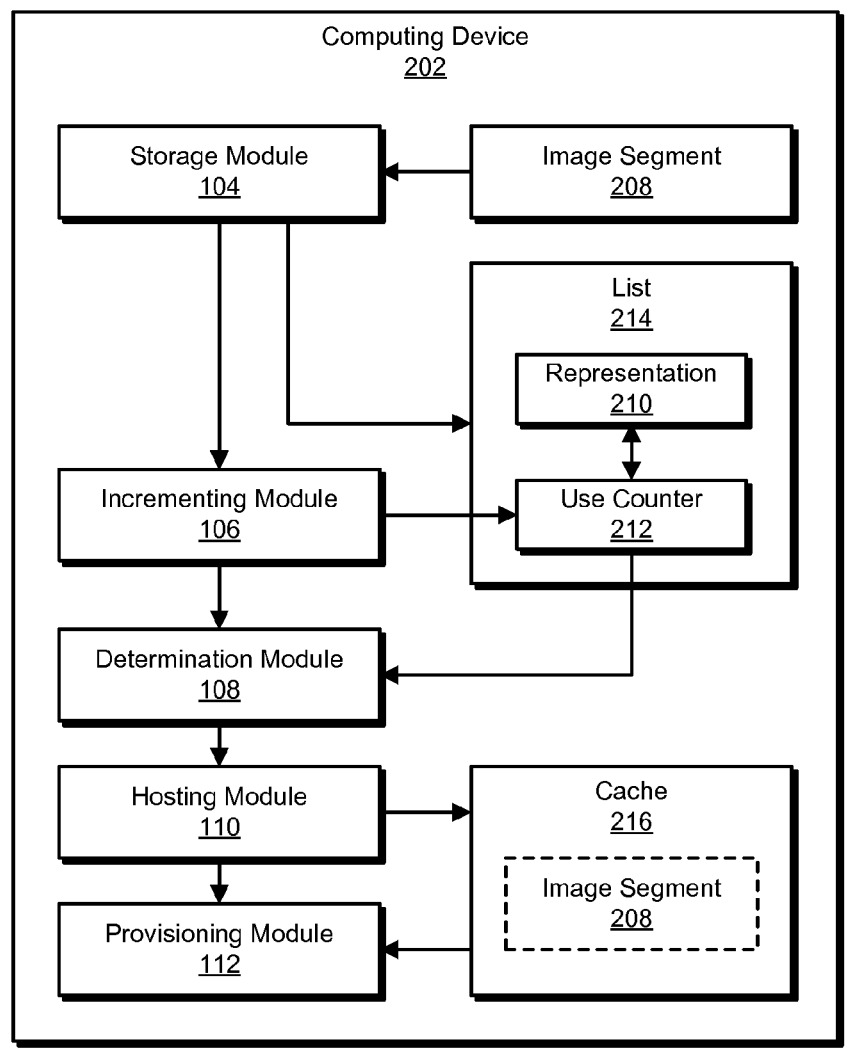
FIG. 2 is a block diagram of an additional exemplary system for provisioning frequently used image segments from caches.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to provision frequently used image segments from caches. For example, and as will be described in greater detail below, storage module 104 may store a representation 210 and a use counter 212 for an image segment 208 that is hosted on a storage system in a list 214 for image segments hosted on the storage system. Incrementing module 106 may increment a current value of use counter 212 for image segment 208 in list 214 each time image segment 208 is provisioned from the storage system. At some later time, determination module 108 may determine that the current value of use counter 212 for image segment 208 has met a predetermined threshold for frequent image-segment provisioning. Next, hosting module 110 may host image segment 208 in a cache 216 that enables quicker provisioning than the storage system enables. Later, provisioning module 112 may provision image segment 208 from cache 216 in response to a request to provision image segment 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
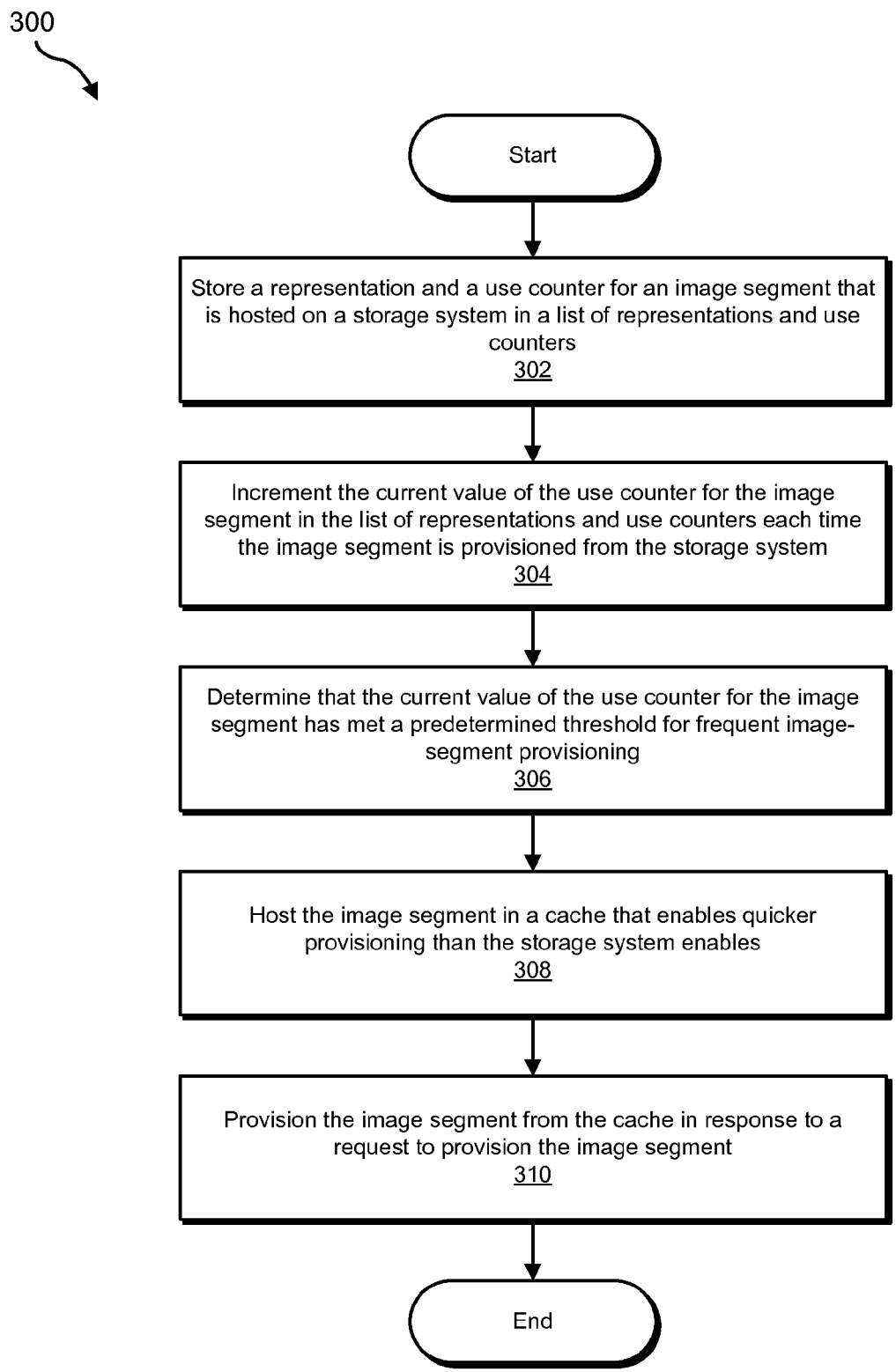
FIG. 3 is a flow diagram of an exemplary method for provisioning frequently used image segments from caches.

FIG. 3 is a flow diagram of an exemplary computer-implemented method 300 for provisioning frequently used image segments from caches. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may store a representation and a use counter for an image segment that is hosted on a storage system in a list of representations and use counters for image segments hosted on the storage system. For example, storage module 104 may, as part of computing device 202 in FIG. 2, store representation 210 and use counter 212 for image segment 208 hosted on a storage system in list 214 for image segments hosted on the storage system.

The term "image segment," as used herein, generally refers to any portion of an image. The term "image," as used herein, generally refers to any representation of a virtualized computing system and/or application that can be used to create a new instance of the virtualized computing system and/or application. In some embodiments, images may include backups of virtual machines. In some examples, the virtual machines may be operating system virtual machines that may represent virtualizations of computing devices running complete operating systems such as WINDOWS and/or MAC OS. In one embodiment, an image segment may include a portion of a backup of a virtual machine.

Figure 4:
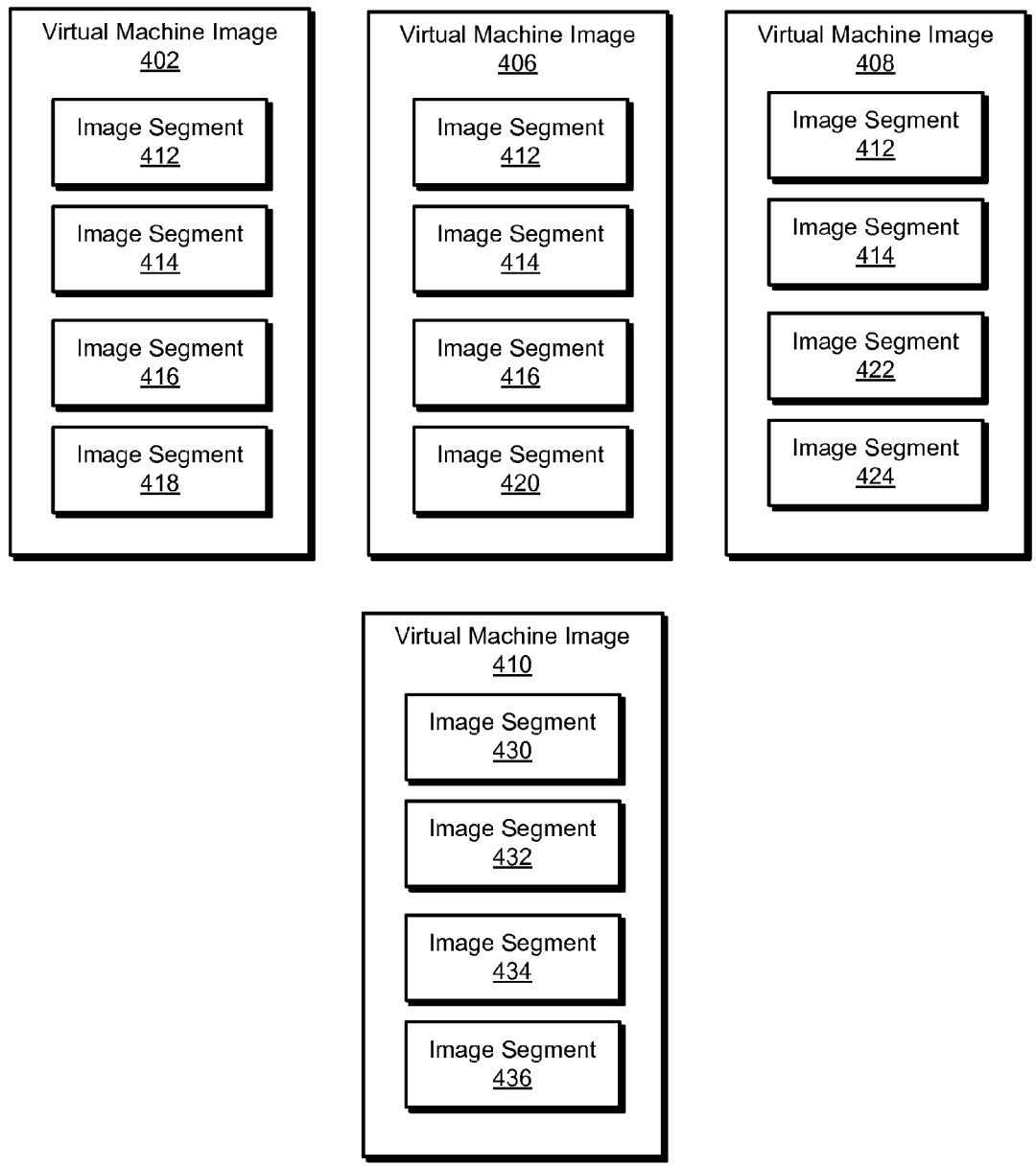
FIG. 4 is a block diagram of an exemplary computing system for provisioning frequently used image segments from caches.

In some examples, an image segment may be used as part of more than one complete backup image. For example, as illustrated in FIG. 4, virtual machine image 402 may be composed of image segments 412, 414, 416, and/or 418. In one embodiment, virtual machine image 402 may represent a WINDOWS XP HOME virtual machine. In some examples, virtual machine image 406 may be composed of image segments 412, 414, 416, and/or 420 and/or may represent a WINDOWS XP PROFESSIONAL virtual machine. Because WINDOWS XP HOME and WINDOWS XP PROFESSIONAL may have a great deal of code in common, virtual machine images 402 and 406 may share a number of image segments, such as image segments 412, 414, and/or 416. In some examples, virtual machine image 408 may be composed of image segments 412, 414, 422, and/or 424 and/or may represent a WINDOWS VISTA virtual machine. Because WINDOWS VISTA shares less code with the two editions of WINDOWS XP than those operating systems share with each other, virtual machine image 408 may have fewer image segments in common with virtual machine images 402 and/or 406. In some embodiments, virtual machine image 410 may represent an OS X virtual machine and/or may be composed of image segments 430, 432, 434, and/or 436. Because OS X has a different codebase and set of applications from WINDOWS, virtual machine image 410 may not share any code segments with virtual machine images 402, 406, and/or 408.

The term "representation," as used herein, generally refers to any data that uniquely identifies an image segment. In some embodiments, a representation may be a hash and/or a partial hash of an image segment. In other embodiments, a representation may be a string that represents an image segment, such as a name, identification number, and/or token. Additionally or alternatively, a representation may be a fingerprint of an image segment.

The term "use counter," as used herein, generally refers to any means of keeping track of the number of times an image segment has been provisioned. In some embodiments, a use counter may be an integer. In some embodiments, a use counter may track when each use occurred and/or expire older uses. For example, a use counter may track that an image segment has been provisioned 12 times in the past week and/or 100 times in the past month. Additionally or alternatively, a use counter may track how many times an image segment has been provisioned alongside another image segment. For example, a use counter may track that an image segment has been provisioned alongside one specific image segment 40 times and another specific image segment 43 times.

The term "storage system," as used herein, generally refers to any collection of computing devices and/or applications used to store data. In some embodiments, a storage system may be hosted on a collection of remote servers (i.e., a cloud computing environment). In other embodiments, a storage system may be hosted in a data center. In some examples, the storage system may store images and/or image segments. Examples of storage systems may include VELOCITY CLOUD BACKUP, GOOGLE CLOUD STORAGE, AMAZON CLOUD STORAGE, and/or SYMANTEC NETBACKUP.

Storage module 104 may store the representation and the use counter for the image segment in a variety of ways. For example, storage module 104 may store a fingerprint of the image segment, a use counter for the image segment, and/or the storage location of the image segment in a hash. In some embodiments, storage module 104 may store the representation and/or use counter in a flat file. In other embodiments, storage module 104 may store the representation and/or use counter in a database. In one embodiment, storage module 104 may receive a set of representations and use counters representing multiple image segments when the list of representations and use counters is first initiated. In another embodiment, storage module 104 may check the list whenever an image segment is provisioned, and may add a representation and use counter for the image segment if there is not already a representation and use counter for the image segment in the list.

At step 304, one or more of the systems described herein may increment a current value of the use counter for the image segment in the list of representations and use counters each time the image segment is provisioned from the storage system. For example, incrementing module 106 may, as part of computing device 202 in FIG. 2, increment a current value of use counter 212 for image segment 208 in list 214 each time image segment 208 is provisioned from the storage system.

Incrementing module 106 may increment the use counter in a variety of contexts. For example, incrementing module 106 may be part of a provisioning system, and may increment the use counter whenever the image segment is provisioned by the provisioning system. In another embodiment, incrementing module 106 may monitor calls to and/or from a provisioning system, and may increment the use counter whenever a call includes information about the image segment. Additionally or alternatively, incrementing module 106 may be part of the storage system and may increment the use counter whenever the image segment is provisioned from the storage system.

At step 306, one or more of the systems described herein may determine that the current value of the use counter for the image segment has met a predetermined threshold for frequent image-segment provisioning. For example, determination module 108 may, as part of computing device 202 in FIG. 2, determine that the current value of use counter 212 for image segment 208 has met a predetermined threshold for frequent image-segment provisioning.

Determination module 108 may determine that the use counter has met the predetermined threshold in a variety of ways. For example, determination module 108 may determine that the use counter has surpassed a static threshold for total uses, such as 100 uses or 1000 uses. In another example, determination module 108 may determine that the use counter has surpassed a threshold for recent uses. For example, determination module 108 may determine that the image segment has been provisioned 200 times within the last month.

In one embodiment, the predetermined threshold for frequent image-segment provisioning may be calculated based on a predetermined percentage of the most frequently provisioned image segments. For example, determination module 108 may determine that the use counter is among the top 10% of use counters and thus the image segment is among the 10% most frequently provisioned image segments.

At step 308, one or more of the systems described herein may host the image segment in a cache that enables quicker provisioning than the storage system enables. For example, hosting module 110 may, as part of computing device 202 in FIG. 2, host image segment 208 in cache 216 that enables quicker provisioning than the storage system enables.

The term "cache," as used herein, generally refers to any memory in a computing system that stores data for efficient retrieval. In some embodiments, hosting module 110 may use a cache to store copies of frequently provisioned image segments. In other embodiments, hosting module 110 may use a cache to store pointers to frequently provisioned image segments. Additionally or alternatively, a cache may store additional data about image segments, such as pointers from one image segment to another.

In some examples, hosting module 110 may include remove an image segment from the cache in response to determining that the current value of the use counter for the image segment no longer meets the predetermined threshold for frequent image-segment provisioning. For example, determination module 108 may determine that an image segment that was placed in the cache after being provisioned at least 200 times each month for most of the last year has been provisioned fewer than 30 times each month for the last two months. In this example, hosting module 110 may remove the copy of that image segment from the cache. In another example, determination module 108 may determine that the use counter for an image segment is no longer in the top 10% of use counters and hosting module 110 may remove the image segment from the cache. Additionally or alternatively, hosting module 110 may determine that the cache is reaching the limits of its storage capacity and may remove the least-frequently-used image segments from the cache.

At step 310, one or more of the systems described herein may provision the image segment from the cache in response to a request to provision the image segment. For example, provisioning module 112 may, as part of computing device 202 in FIG. 2, provision image segment 208 from cache 216 in response to a request to provision image segment 208.

Provisioning module 112 may provision the image segment from the cache in a variety of contexts. For example, provisioning module 112 may be part of a provisioning system and may receive a request for the image segment, determine that the image segment is in the cache, and then provision the image segment from the cache. In another embodiment, provisioning module 112 may be part of the storage system and may receive a request to provision the image segment from the cache.

In some embodiments, provisioning module 112 may have access to a list of which image segments are in the cache. In these embodiments, hosting module 110 may add the fingerprint of the image segment to a list of fingerprints of image segments hosted in the cache and provisioning module 112 may provision the image segment from the cache by determining, based on the presence of the fingerprint of the image segment in the list of fingerprints of image segments hosted in the cache, that the image segment is hosted in the cache. In some examples, if the image segment is later removed from the cache, the fingerprint of the image segment may also be removed from the list of fingerprints of image segments in the cache.

Figure 5:
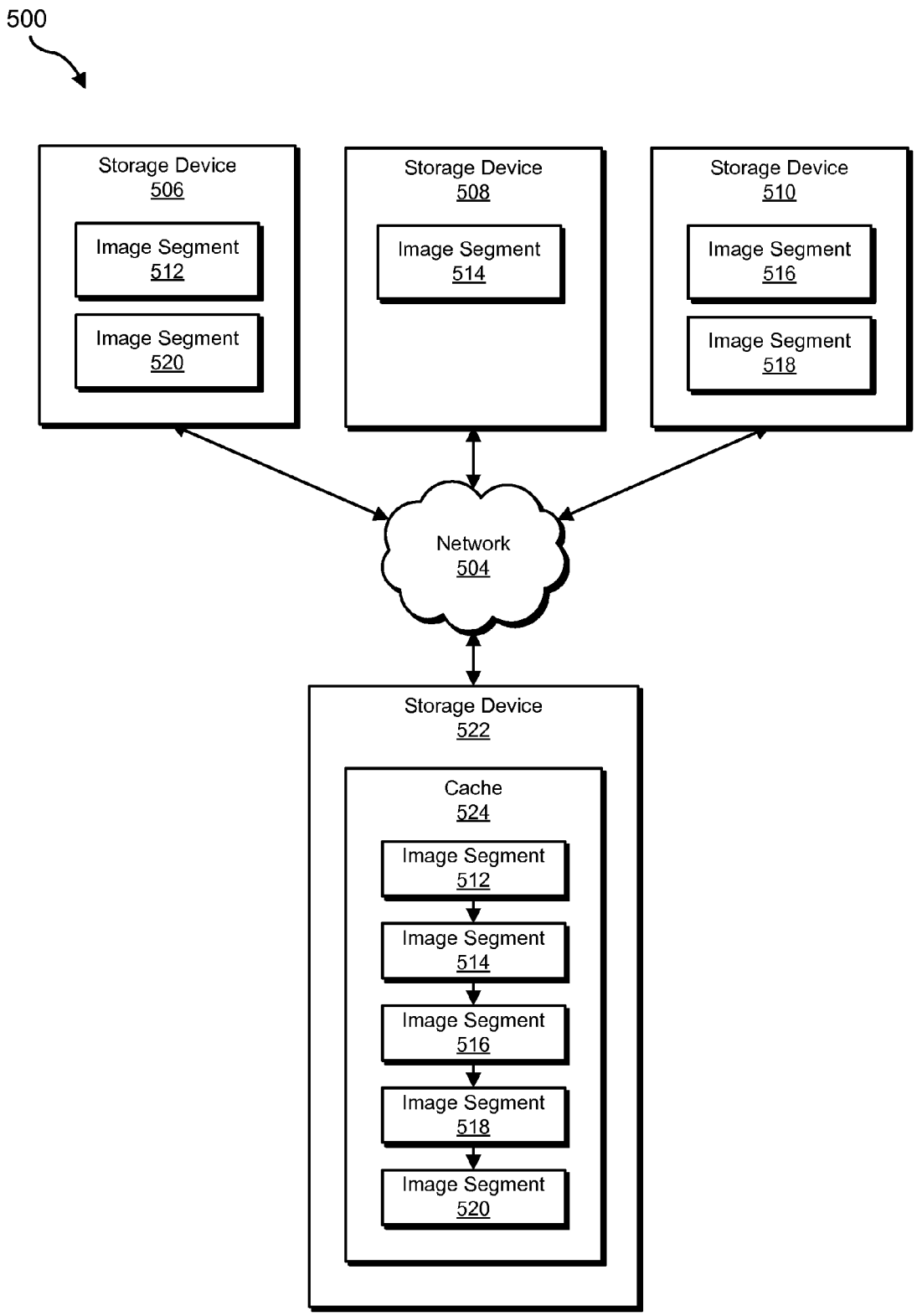
FIG. 5 is a block diagram of an exemplary computing system for provisioning frequently used image segments from caches.

In some embodiments, provisioning module 112 may have access to additional information about the image segment. In these embodiments, hosting module 110 may store information about at least one location of at least one additional image segment that is frequently provisioned alongside the image segment and that is also hosted in the cache, and provisioning module 112 may provision the image segment from the cache by also provisioning the additional image segment from the cache by using the stored information about the location of the additional image segment. As illustrated in FIG. 5, storage system 500 may include storage devices 506, 508, 510, and/or 522. In some examples, storage device 506 may host image segments 512 and/or 520, storage device 508 may host image segment 514, and/or storage device 510 may host image segments 516 and/or 518.

In some examples, image segments 512, 514, 516, 518, and/or 520 may be frequently provisioned together. In some embodiments, this may be because image segments 512, 514, 516, 518, and/or 520 are all segments of the same or similar virtual machine images. In some examples, image segments that are part of the same or similar virtual machine images may end up scattered across storage devices over time as virtual machine images are added to and removed from the storage system. In one example, image segments 512, 514, 516, 518, and/or 520 may be provisioned frequently enough to be hosted in cache 524 on storage device 522. In one embodiment, cache 524 may store pointers in between each image segment and the next image segment, such as between image segment 512 and image segment 514, in order to more efficiently provision the image segments together. In some embodiments, cache 524 and/or other systems that communicate with cache 524 may store links between each segment and each other segment.

As explained in connection with method 300 above, the systems described herein may create a set of fingerprints and use counters that each represent an image segment in a storage system. Each time an image segment is provisioned, the systems described herein may increment the use counter for that image segment. After a suitable training period has passed, the systems described herein may determine the most frequently provisioned image segments based on the use counters and may host those image segments in a cache. The systems described herein may also track which image segments are frequently provisioned together and may store information on the relationships between those image segments. By hosting frequently used image segments in a cache, the systems described herein may decrease provisioning time for the most commonly provisioned virtual machines, increasing efficiency and user satisfaction. By storing relationships between image segments that represent portions of the same or of similar virtual machines, the systems described herein may avoid searching through fragmented storage systems for scattered image segments and thus may be able to further reduce the time it takes to provision commonly used virtual machines.

Figure 6:
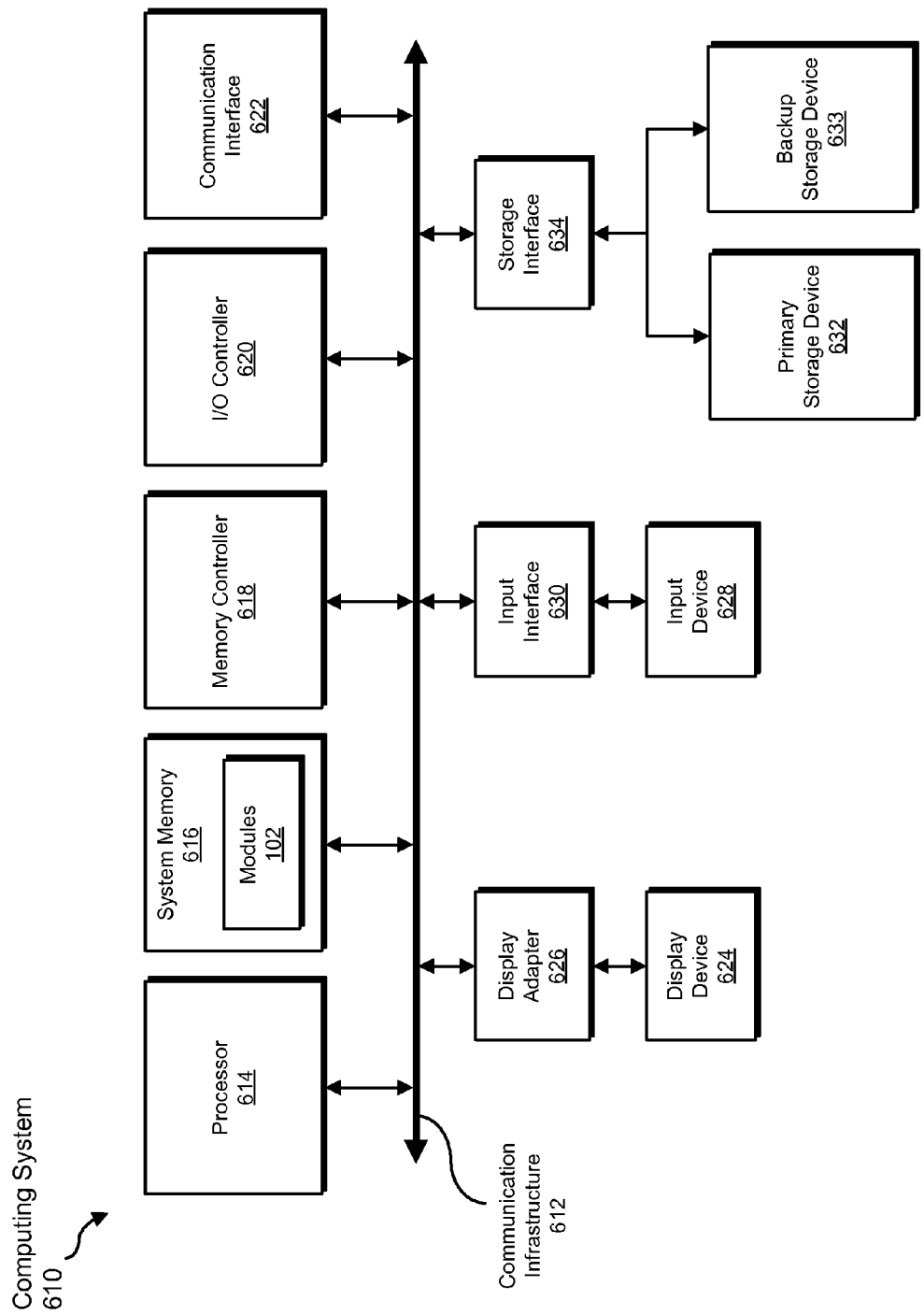
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
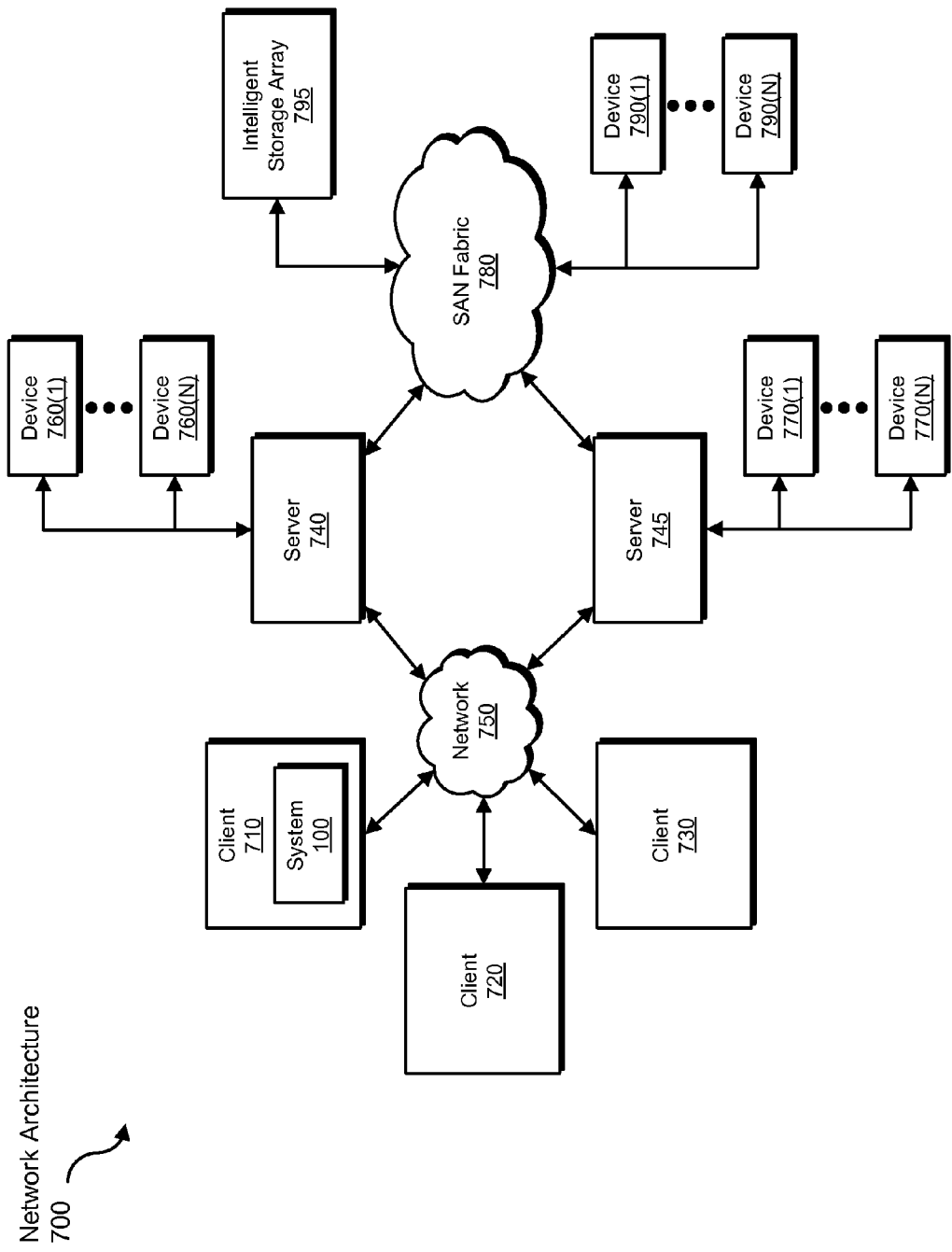
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for provisioning frequently used image segments from caches.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive image segment usage data to be transformed, transform the image segment usage data into counters, output a result of the transformation to a list of counters, use the result of the transformation to track image segment usage, and store the result of the transformation to a list. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for provisioning frequently used image segments from caches, at least a portion of the method being performed by a computing device comprising at least one processor, the method comprising:
    storing a representation and a use counter for an image segment that is hosted on a storage system in a list of representations and use counters for image segments hosted on the storage system;
    incrementing a current value of the use counter for the image segment in the list of representations and use counters each time a call, to a provisioning system, includes information about the image segment;
    incrementing the current value of the use counter for the image segment in the list of representations and use counters each time the image segment is provisioned from the storage system;
    determining that the current value of the use counter for the image segment has met a predetermined threshold for frequent image segment provisioning;
    hosting the image segment in a cache that enables quicker provisioning than the storage system enables;
    provisioning the image segment from the cache in response to a request to provision the image segment; and
    removing the image segment from the cache in response to determining that the current value of the use counter for the image segment no longer meets the predetermined threshold for frequent image-segment provisioning, wherein the current value of the use counter is lower than a predetermined lower threshold for two consecutive provisioning periods.

2. The computer-implemented method of claim 1, wherein:
    the hosting the image segment in the cache comprises adding a fingerprint of the image segment to a list of fingerprints of image segments hosted in the cache;
    the provisioning the image segment from the cache comprises determining, based on the presence of the fingerprint of the image segment in the list of fingerprints of image segments hosted in the cache, that the image segment is hosted in the cache.

3. The computer-implemented method of claim 1, wherein the predetermined threshold for frequent image segment provisioning is calculated based on a predetermined number of the most frequently provisioned image segments over one or more of the provisioning periods.

4. The computer-implemented method of claim 1, wherein the hosting the image segment in the cache comprises storing information about at least one location of at least one additional image segment that is frequently provisioned alongside the image segment and that is also hosted in the cache.

5. The computer-implemented method of claim 4, wherein the provisioning the image segment from the cache comprises efficiently provisioning the additional image segment from the cache by using the stored information about the location of the additional image segment.

6. The computer-implemented method of claim 1, wherein the image segment comprises a portion of a backup of a virtual machine.

7. The computer-implemented method of claim 1, further comprising removing one or more least-frequently-used image segments from the cache when the cache is reaching a storage capacity limit.

8. A system for provisioning frequently used image segments from caches, the system comprising:
    a storage module, stored in memory, that stores a representation and a use counter for an image segment that is hosted on a storage system in a list of representations and use counters for image segments hosted on the storage system;
    an incrementing module, stored in the memory, that:

increments a current value of the use counter for the image segment in the list of representations and use counters each time a call, to a provisioning system, includes information about the image segment; and increments the current value of the use counter for the image segment in the list of representations and use counters each time the image segment is provisioned from the storage system;

a determination module, stored in memory, that determines that the current value of the use counter for the image segment has met a predetermined threshold for frequent image segment provisioning;

a hosting module, stored in memory, that hosts the image segment in a cache that enables quicker provisioning than the storage system enables, wherein the hosting module removes the image segment from the cache in response to determining that the current value of the use counter for the image segment no longer meets the predetermined threshold for frequent image-segment provisioning, wherein the current value of the use counter is lower than a predetermined lower threshold for two consecutive provisioning periods;

a provisioning module, stored in memory, that provisions the image segment from the cache in response to a request to provision the image segment; and at least one physical processor configured to execute the storage module, the incrementing module, the determination module, the hosting module, and the provisioning module.

9. The system of claim 8, wherein:
the hosting module hosts the image segment in the cache by adding a fingerprint of the image segment to a list of fingerprints of image segments hosted in the cache;
the provisioning module provisions the image segment from the cache by determining, based on the presence of the fingerprint of the image segment in the list of fingerprints of image segments hosted in the cache, that the image segment is hosted in the cache.

10. The system of claim 8, wherein the predetermined threshold for frequent image segment provisioning is calculated based on a predetermined number of the most frequently provisioned image segments over one or more of the provisioning periods.

11. The system of claim 8, wherein the hosting module hosts the image segment in the cache by storing information about at least one location of at least one additional image segment that is frequently provisioned alongside the image segment and that is also hosted in the cache.

12. The system of claim 11, wherein the provisioning module provisions the image segment from the cache by efficiently provisioning the additional image segment from the cache by using the stored information about the location of the additional image segment.

13. The system of claim 8, wherein the image segment comprises a portion of a backup of a virtual machine.

14. The system of claim 8, wherein the hosting module removes one or more least-frequently-used image segments from the cache when the cache is reaching a storage capacity limit.

15. A non-transitory computer-readable medium comprising one or more computer-readable instructions that, when executed by at least one processor of a computing device, cause the computing device to:

store a representation and a use counter for an image segment that is hosted on a storage system in a list of representations and use counters for image segments hosted on the storage system;

increment a current value of the use counter for the image segment in the list of representations and use counters each time a call, to a provisioning system, includes information about the image segment;

increment the current value of the use counter for the image segment in the list of representations and use counters each time the image segment is provisioned from the storage system;

determine that the current value of the use counter for the image segment has met a predetermined threshold for frequent image segment provisioning;

host the image segment in a cache that enables quicker provisioning than the storage system enables;

provision the image segment from the cache in response to a request to provision the image segment; and remove the image segment from the cache in response to determining that the current value of the use counter for the image segment no longer meets the predetermined threshold for frequent image-segment provisioning, wherein the current value of the use counter is lower than a predetermined lower threshold for two consecutive provisioning periods.

16. The non-transitory computer-readable medium of claim 15,
host the image segment in the cache by adding a fingerprint of the image segment to a list of fingerprints of image segments hosted in the cache;
provision the image segment from the cache by determining, based on the presence of the fingerprint of the image segment in the list of fingerprints of image segments hosted in the cache, that the image segment is hosted in the cache.

17. The non-transitory computer-readable medium of claim 15, wherein the predetermined threshold for frequent image segment provisioning is further calculated based on a predetermined number of the most frequently provisioned image segments over one or more of the provisioning periods.

18. The non-transitory computer-readable medium of claim 15, wherein the one or more computer-readable instructions cause the computing device to host the image segment in the cache by storing information about at least one location of at least one additional image segment that is frequently provisioned alongside the image segment and that is also hosted in the cache.

19. The non-transitory computer-readable medium of claim 18, wherein the one or more computer-readable instructions cause the computing device to provision the image segment from the cache by efficiently provisioning the additional image segment from the cache by using the stored information about the location of the additional image segment.

20. The non-transitory computer-readable medium of claim 15, wherein the one or more computer-readable instructions cause the computing device to remove one or more least-frequently-used image segments from the cache when the cache is reaching a storage capacity limit.

* * * * *

UNITED STATES PATENT AND TRADEMARK OFFICE
CERTIFICATE OF CORRECTION

PATENT NO. : 9,983,796 B2
APPLICATION NO. : 14/856586
DATED : May 29, 2018
INVENTOR(S) : Yang et al.

Page 1 of 1

It is certified that error appears in the above-identified patent and that said Letters Patent is hereby corrected as shown below:

On the Title Page

Under "Primary Examiner", in Column 2, Line 1, delete "Tracy Chan" insert -- Tracy C Chan --, therefor.

In the Claims

In Column 18, Line 39, in Claim 17, delete "is further calculated" and insert -- is calculated --, therefor.

Signed and Sealed this
Twenty-eighth Day of August, 2018

Andrei Iancu
*Director of the United States Patent and Trademark Office*